(12) United States Patent
Butler

(10) Patent No.: US 9,869,108 B2
(45) Date of Patent: Jan. 16, 2018

(54) UTILITY OR METER POLE TOP REINFORCEMENT METHOD AND APPARATUS

(71) Applicant: PLS Technologies, Inc., Palm Harbor, FL (US)

(72) Inventor: Robert P. Butler, Palm Harbor, FL (US)

(73) Assignee: PLS Technologies, Inc., Palm Harbor, FL (US)

( * ) Notice: Subject to any disclaimer, the term of this patent is extended or adjusted under 35 U.S.C. 154(b) by 0 days.

(21) Appl. No.: 15/435,934

(22) Filed: Feb. 17, 2017

(65) Prior Publication Data

US 2017/0159319 A1 Jun. 8, 2017

Related U.S. Application Data

(60) Continuation-in-part of application No. 15/352,176, filed on Nov. 15, 2016, now Pat. No. 9,580,926, which is a continuation-in-part of application No. 15/055,832, filed on Feb. 29, 2016, now Pat. No. 9,528,290, which is a continuation-in-part of application No. 14/624,845, filed on Feb. 18, 2015, now abandoned, which is a division of application No. 14/082,824, filed on Nov. 18, 2013, now Pat. No. 8,984,834.

(51) Int. Cl.
| | | |
|---|---|---|
| *E04H 12/24* | (2006.01) | |
| *E02D 5/22* | (2006.01) | |
| *E04H 12/22* | (2006.01) | |
| *H02G 7/05* | (2006.01) | |
| *H02G 7/20* | (2006.01) | |
| *H02G 1/02* | (2006.01) | |

(52) U.S. Cl.
CPC ............. *E04H 12/24* (2013.01); *E02D 5/226* (2013.01); *E04H 12/2292* (2013.01); *H02G 7/05* (2013.01); *H02G 7/20* (2013.01); *H02G 1/02* (2013.01)

(58) Field of Classification Search
CPC ..... E04B 1/40; E04B 2001/405; E04H 12/24; E04H 12/04; E04H 12/2292; H01F 27/06; H02G 7/20; H01B 17/16; H01B 5/02
See application file for complete search history.

(56) References Cited

U.S. PATENT DOCUMENTS

| | | | | |
|---|---|---|---|---|
| 868,591 | A * | 10/1907 | Yaxley | ................ E04H 12/24 174/45 R |
| 1,485,629 | A * | 3/1924 | Seeger | ................ H02G 7/20 174/45 R |

(Continued)

*Primary Examiner* — Joshua J Michener
*Assistant Examiner* — Matthew J Gitlin
(74) *Attorney, Agent, or Firm* — Nicholas Pfeifer; Smith & Hopen, P.A.

(57) ABSTRACT

An apparatus for reinforcing an upstanding utility/meter pole having a worn top includes an elongated brace adapted to bear against the pole near a top end of the pole. A washer plate is disposed in overlying relation to the elongated brace. A front support is secured to an opposite side of the pole by an elongated bolt that extends diametrically through the pole and is engaged by a nut to secure the brace and front support in sandwiching relation to the pole. Additional embodiments are designed to reinforce cross arms secured to the utility pole.

12 Claims, 14 Drawing Sheets

(56) References Cited

U.S. PATENT DOCUMENTS

| | | | |
|---|---|---|---|
| 3,268,191 A * | 8/1966 | Bridges | H02G 7/20 248/72 |
| 3,856,250 A | 12/1974 | Farmer | |
| 4,262,047 A * | 4/1981 | Barnett | B29D 24/005 428/116 |
| 4,407,601 A | 10/1983 | Reeder | |
| 4,516,756 A | 5/1985 | Beatty | |
| 4,598,515 A | 7/1986 | Chapman | |
| 4,803,819 A | 2/1989 | Kelsey | |
| 4,932,623 A * | 6/1990 | Reisdorff | H02G 7/20 248/219.3 |
| 4,987,718 A | 1/1991 | Knight | |
| 5,605,017 A * | 2/1997 | Fingerson | E04C 3/28 174/153 R |
| 5,799,918 A * | 9/1998 | Swinderman | B65D 88/66 248/219.1 |
| 6,111,553 A | 8/2000 | Steenbuck | |
| 6,336,620 B1 | 1/2002 | Belli | |
| 6,347,488 B1 * | 2/2002 | Koye | E04H 12/24 174/146 |
| 7,393,157 B1 | 7/2008 | Macias | |
| 8,061,666 B1 | 11/2011 | Fortin et al. | |
| 9,231,394 B2 * | 1/2016 | Cariaga Crespo | H02G 7/05 |
| 2004/0084582 A1 * | 5/2004 | Kralic | H01Q 1/1228 248/219.3 |
| 2011/0083399 A1 * | 4/2011 | Lettkeman | E04H 12/24 52/745.21 |
| 2014/0131525 A1 * | 5/2014 | Lockhart | E04H 12/24 248/49 |

* cited by examiner

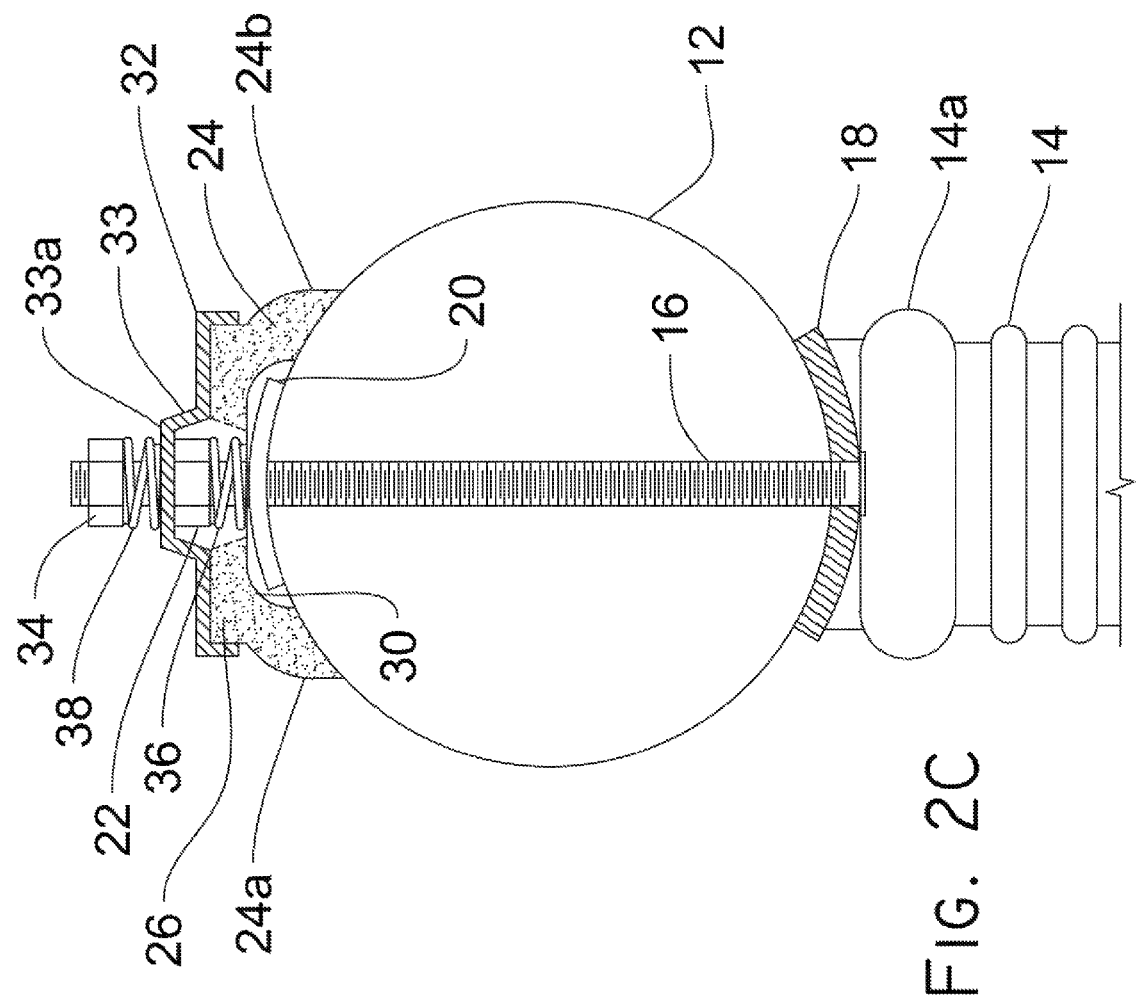

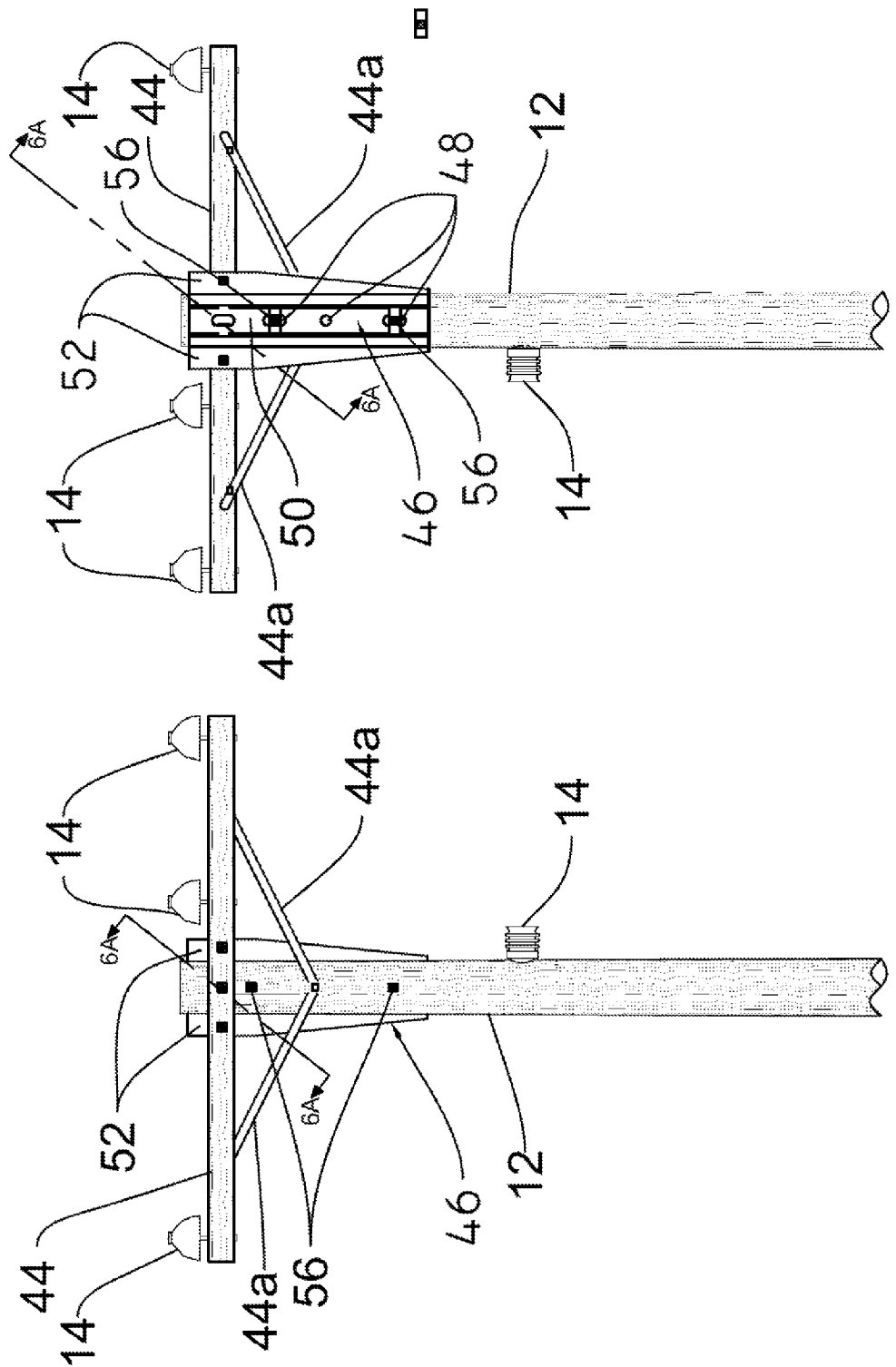

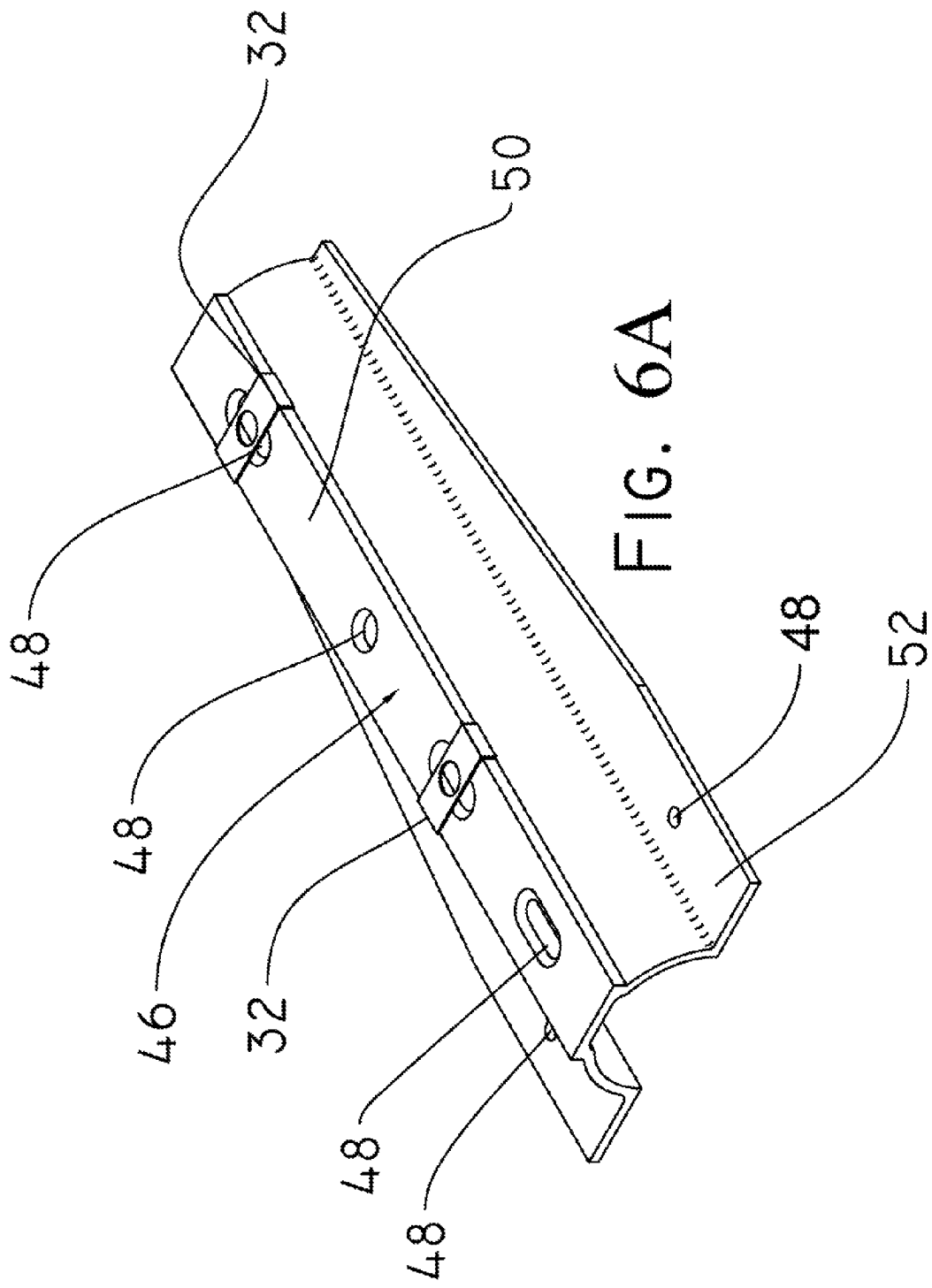

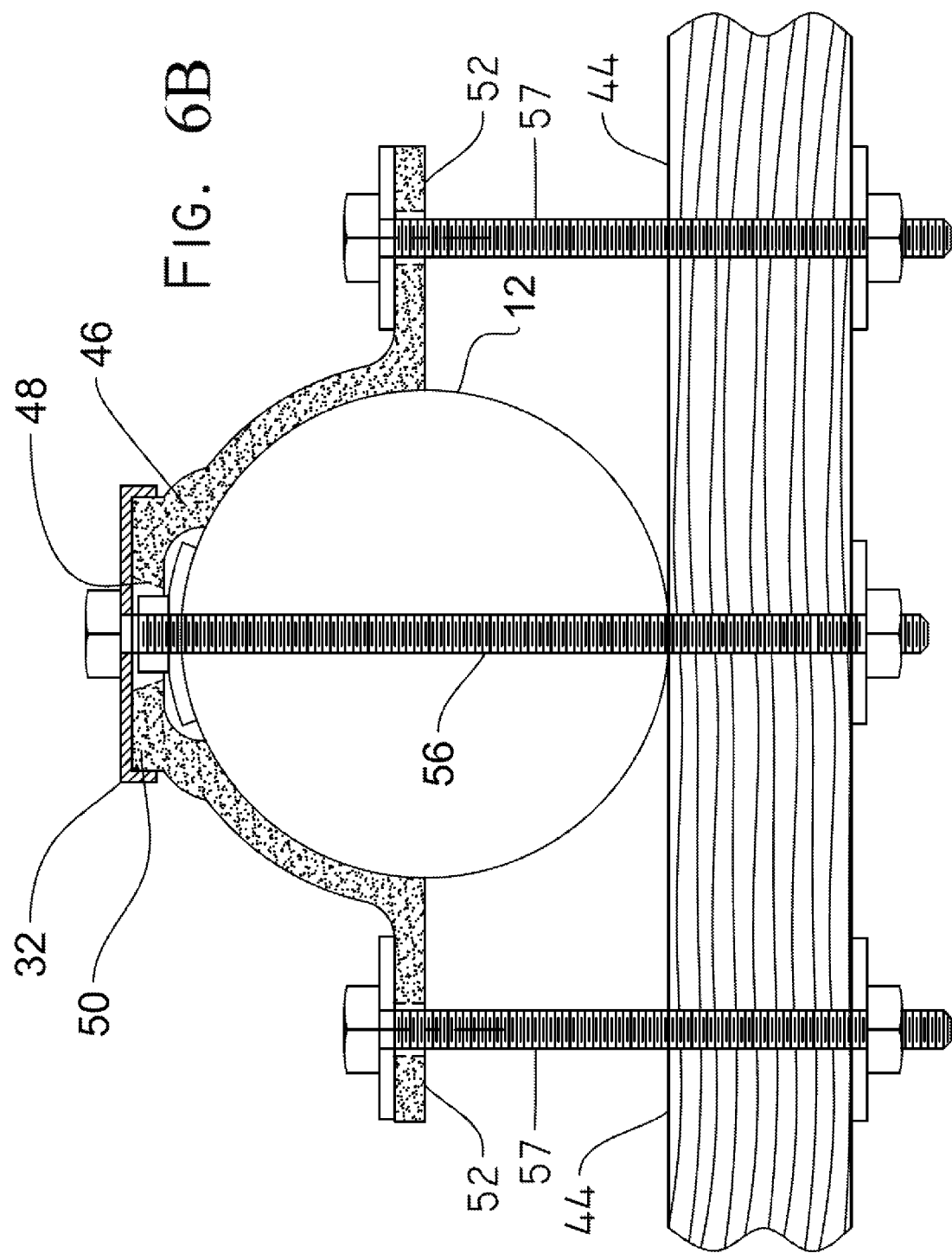

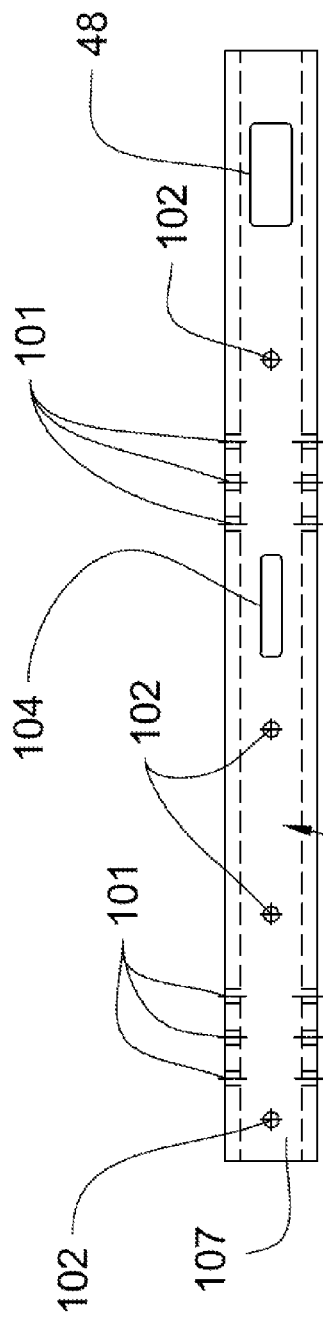
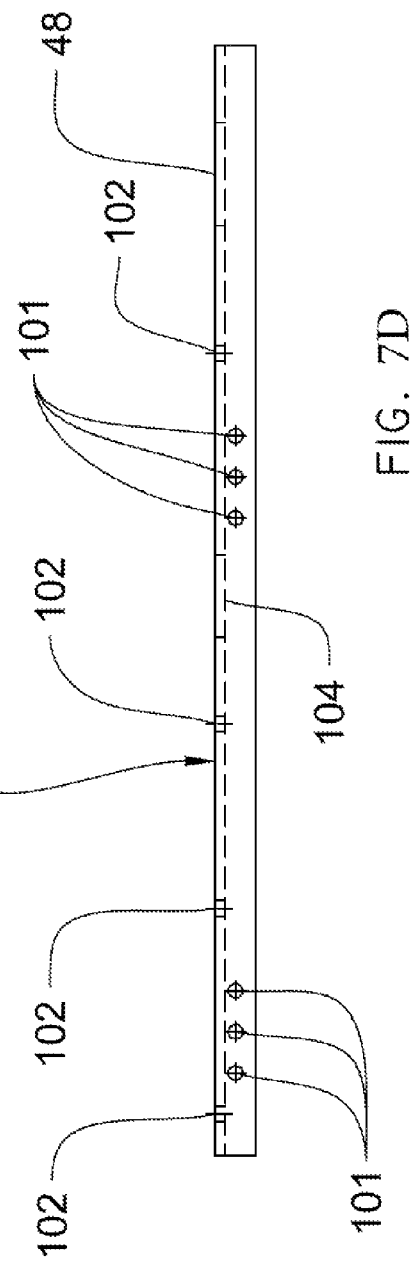

UTILITY OR METER POLE TOP REINFORCEMENT METHOD AND APPARATUS

CROSS-REFERENCE TO RELATED APPLICATIONS

This nonprovisional application is a continuation-in-part of and claims priority to nonprovisional application Ser. No. 15/352,176, entitled "UTILITY OR METER POLE TOP REINFORCEMENT METHOD AND APPARATUS," filed Nov. 11, 2016, which will issue on Feb. 28, 2017 as U.S. Pat. No. 9,580,926, which is a continuation-in-part of and claims priority to nonprovisional application Ser. No. 15/055,832, entitled "UTILITY OR METER POLE TOP REINFORCEMENT METHOD AND APPARATUS," filed Feb. 29, 2016, issued on Dec. 27, 2016 as U.S. Pat. No. 9,528,290, which is a continuation-in-part of and claims priority to nonprovisional application Ser. No. 14/624,845, entitled "UTILITY OR METER POLE TOP REINFORCEMENT METHOD AND APPARATUS," filed Feb. 18, 2015, now abandoned, which is a divisional and claims priority to nonprovisional application Ser. No. 14/082,824, entitled "UTILITY OR METER POLE TOP REINFORCEMENT METHOD AND APPARATUS," filed Nov. 18, 2013, issued on Mar. 24, 2015 as U.S. Pat. No. 8,984,834, by the same inventor.

BACKGROUND OF THE INVENTION

1. Field of the Invention

This invention relates, generally, to repair/reinforcement of upstanding poles such as utility poles. More particularly, it relates to methods and apparatuses for strengthening the tops of poles and/or cross arms that have structurally deteriorated over time to avoid or delay the cost of replacing such poles and cross arms.

2. Description of the Prior Art

Utility poles become degraded over time near the ground and also at their upper end. There are many patented devices for strengthening such poles at or near the ground so that they don't fall over but there has been little inventive activity for strengthening the upper end of such poles to which are connected dedicated voltage transmission/distribution lines as well as telephone/CATV lines.

Meter poles are smaller versions of utility poles; they are positioned near structures such as mobile homes where laws forbid the direct attachment of permanent lines. As used herein, the term "pole" refers to utility as well as meter poles or any other type of pole that may be in need of upper end reinforcement.

The current cost of replacing a utility pole that has lost its structural integrity is about three thousand dollars per pole. Every U.S. state has millions of such poles. There are between one hundred thirty to one hundred eighty million utility poles in use in North America and most utility companies replace about six thousand poles per year. The cost of course is passed along to the consumer.

The upper ends of many pressure-treated poles that were installed in the decade of the 1970s are now losing their structural integrity and are in need of replacement. The same will of course hold true in the future of poles installed in later decades as well. However, it would save companies and consumers substantial monies if those poles could be reinforced instead of replaced.

However, in view of the art considered as a whole at the time the present invention was made, it was not obvious to those of ordinary skill in the art how the upper ends of such poles could be reinforced at a cost substantially less than pole-replacement costs.

SUMMARY OF THE INVENTION

The long-standing but heretofore unfulfilled need for a device that reinforces deteriorating utility poles, meter poles, and the like is now met by a new, useful, and non-obvious invention.

The inventive structure is an apparatus for reinforcing an upstanding pole having an upper end that is worn, rotted, damaged, or otherwise in a deteriorated state.

The novel structure includes an elongated brace and at least two bolt-accommodating openings formed in the elongated brace. Each bolt-accommodating opening is centered on a longitudinal axis of symmetry of the elongated brace. The elongated brace is adapted to bear against the upstanding pole near the worn upper end of the upstanding pole.

At least two washer plates are disposed in overlying relation to the elongated brace and a bolt-accommodating opening is formed in each washer plate. The bolt-accommodating opening is centered on a longitudinal axis of symmetry of each washer plate and is aligned with a bolt-receiving opening formed in the elongated brace.

At least two elongated bolts are adapted to extend diametrically through the upstanding pole. Each elongated bolt extends through a preselected bolt-accommodating opening formed in the elongated brace and through the bolt-accommodating opening formed in the associated washer plate.

Each elongated bolt has a tool-engageable head and a free end that extends outwardly from the upstanding pole diametrically opposite from the tool-engageable head. A nut screw-threadedly engages the free end of each elongated bolt and advancement of the nut increasingly secures the associated washer plate to the elongated brace and therefore increasingly secures the elongated brace to the upstanding pole so that the upper end of the upstanding pole is reinforced by the elongated brace.

The elongated brace has a base and a pair of laterally spaced apart legs are formed integrally with the base. The legs are adapted to bear against the upstanding pole.

At least one cavity for accommodating a pre-existing, conventional washer is formed in the elongated brace in open communication with each bolt-accommodating opening. Each elongated bolt extends through the conventional washer-accommodating opening when the nut secures said washer plate to said elongated brace.

In a second embodiment, each washer plate has a recessed channel formed therein, centered on the longitudinal axis of symmetry of the washer plate. The recessed channel extends into an associated bolt-receiving opening and a spring lock is disposed in overlying relation to a bottom wall of the recessed channel. A nut screw-threadedly engages the free end of the elongated bolt in bearing relation to the spring lock so that advancing the nut increasingly urges the washer plate towards the elongated brace and therefore increasingly presses the elongated brace against the upper end of the upstanding pole.

In a third embodiment, each washer plate has a raised ridge formed therein, centered on the longitudinal axis of symmetry of the washer plate, said longitudinal axis of symmetry being coincident with the longitudinal axis of symmetry of the elongated brace.

In the third embodiment, a first spring lock is disposed in each bolt-accommodating opening formed in the elongated brace and a first nut is screw-threadedly engaged to the free end of the elongated bolt in bearing relation to the first spring lock. The elongated ridge is disposed in overlying relation to the first nut and a second spring lock is disposed in overlying relation to the elongated ridge. A second nut screw-threadedly engages the free end of the elongated bolt in bearing engagement to the second spring lock so that advancement of the first and second nuts enables each washer plate to bear increasingly against the elongated brace and thus cause the elongated brace to bear increasingly against the upper end of the pole, thereby reinforcing it.

All three embodiments include an elongated front support member that is arcuate in transverse section to conform to the surface of the pole and which is mounted on the upper end of the pole in diametric relation to the elongated brace so that the damaged upper end of the upstanding pole is sandwiched between the front support member and the elongated brace.

At least two openings are formed in the front support member to accommodate the elongated bolts that secure the front support member to the upstanding pole. The elongated bolt that extends through the elongated brace and washer plate is the same elongated bolt that extends through the preselected opening formed in the front support member, i.e., the elongated bolts secure the front support member to a first side of the pole and secure the elongated brace to a second, diametrically opposed side of the pole so that the upper end of the pole is sandwiched between the front support member and the elongated brace.

A fourth embodiment of the invention is an apparatus for supporting a horizontally disposed cross arm mounted to an upstanding pole. It includes a vertical cross arm support member adapted to be secured to both the pole and the existing cross arm of the pole to provide pole attachment strength and stability.

An elongated brace is adapted to abut the pole in diametrically opposed relation to the cross arm support member. An aperture is formed in the elongated brace and aligned with an aperture formed in the elongated base support of the cross arm support member to receive a bolt that extends diametrically through the pole to secure the vertical cross arm support member to the pole.

In an embodiment, the vertical cross arm support member comprises an elongated base support with two flanges extending outward in opposite direction from the longitudinal axis of the vertical cross arm support member. The flanges are intended to extend parallel with the existing cross arm on the pole. Each flange includes one or more apertures adapted to receive a bolt extending diametrically through the existing cross arm on the pole. The attachment of the flanges to the existing cross arm prevents rotation of the existing cross arm in a horizontal plane about a longitudinal axis of the pole. Additionally, the elongated structure in conjunction with the flanges prevents rotation in a vertical plane.

An embodiment of the cross arm support member is a horizontal support designed to attach to a side of the existing cross arm without requiring an installer to first remove the insulators installed on the existing cross arm. Said embodiment includes an elongated front wall having a first aperture with a size and shape to receive an existing through bolt passing through the upstanding utility pole and the cross arm. The front wall also includes a second aperture configured to receive a through bolt passing through the cross arm and the front wall. The support further includes an upper flange extending from an upper half of the front wall in a lateral direction and a lower flange extending from a lower half of the front wall in the lateral direction.

In an embodiment, an open cavity exists between the upper flange and the lower flange at least partially along the extent of the elongated front wall. The open cavity is configured to receive existing nuts or bolts secured to the cross arm. In an embodiment, the cavity having a height less than a height of the cross arm.

The upper flange includes at least two laterally spaced insulator apertures that are axially aligned with two laterally spaced insulator apertures on the lower flange. Thus, the insulators can be secured directly to the support after the support is secured to the cross arm. In an embodiment, the upper and lower flanges have at least two laterally spaced sets of insulator apertures, wherein each set includes two or more insulator apertures.

In an embodiment, the support includes an access opening laterally spaced between eighteen and twenty-four inches from the first aperture. The access opening is configured to provide access to an existing nut or bolt securing a support beam to the cross arm.

A general object of this invention is to lengthen the lifetime of upstanding poles such as a utility poles owned by a public or private utility company or meter poles of the type used in connection with mobile homes.

A more specific object is to reinforce the upper end of such poles at a cost that is much less than the cost of replacing such a pole.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 2C is a view similar to the sectional view of FIG. 2A but depicts a third embodiment;

FIG. 5A is a front elevational view of the fourth embodiment;

FIG. 5B is a rear elevational view of the fourth embodiment;

FIG. 6A is a perspective view of a certain embodiment of the vertical cross arm support member;

FIG. 6B is a sectional view taken along line 6B-6B in FIGS. 5A and 5B;

FIG. 7C is a rear view of an embodiment of the vertical cross arm support member;

FIG. 7D is a top view of an embodiment of the vertical cross arm support member;

DETAILED DESCRIPTION OF THE PREFERRED EMBODIMENT

Figure 1A:
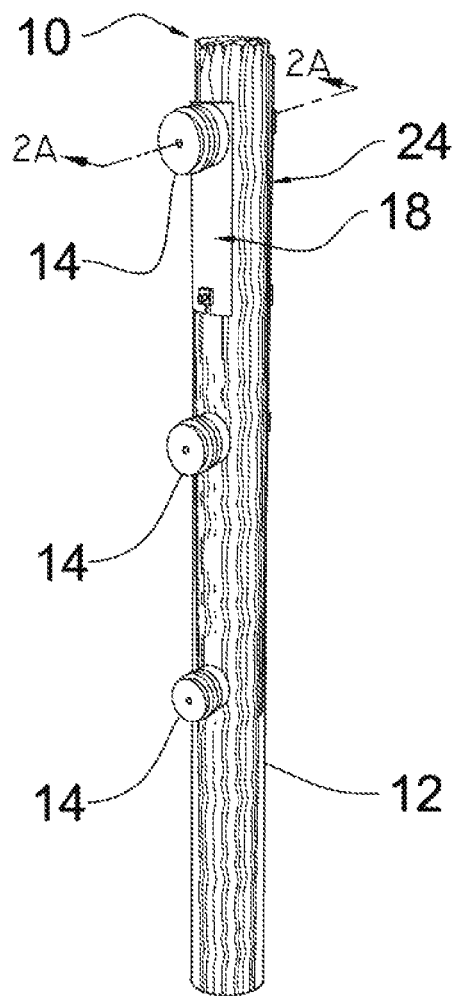
FIG. 1A is a front perspective view of a first embodiment.
Figure 1B:
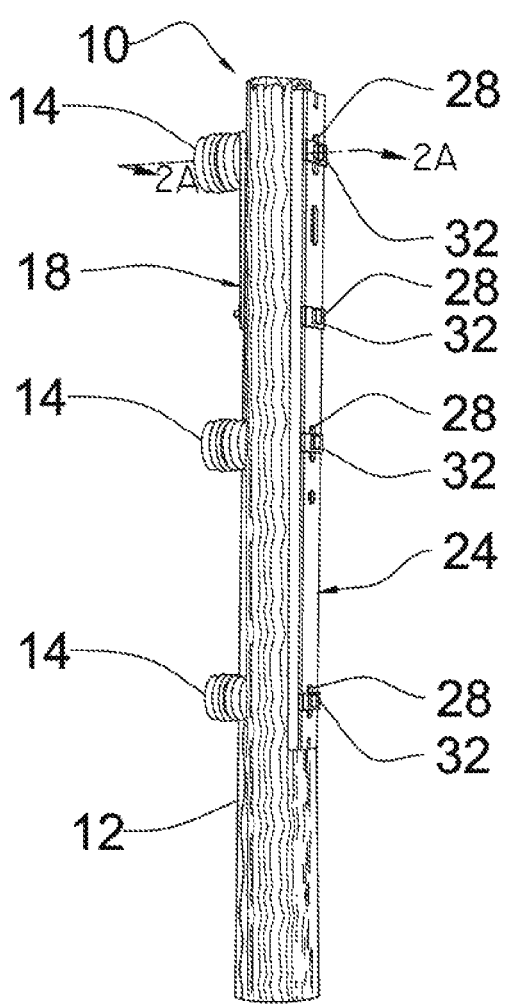
FIG. 1B is a rear perspective view of the first embodiment.

FIGS. 1A and 1B depict a first illustrative embodiment of the novel structure, denoted 10 as a whole, when installed on a utility or meter pole 12 having at least one insulator 14 secured thereto. The structure is perhaps more fully disclosed in FIG. 2.

Figure 2A:
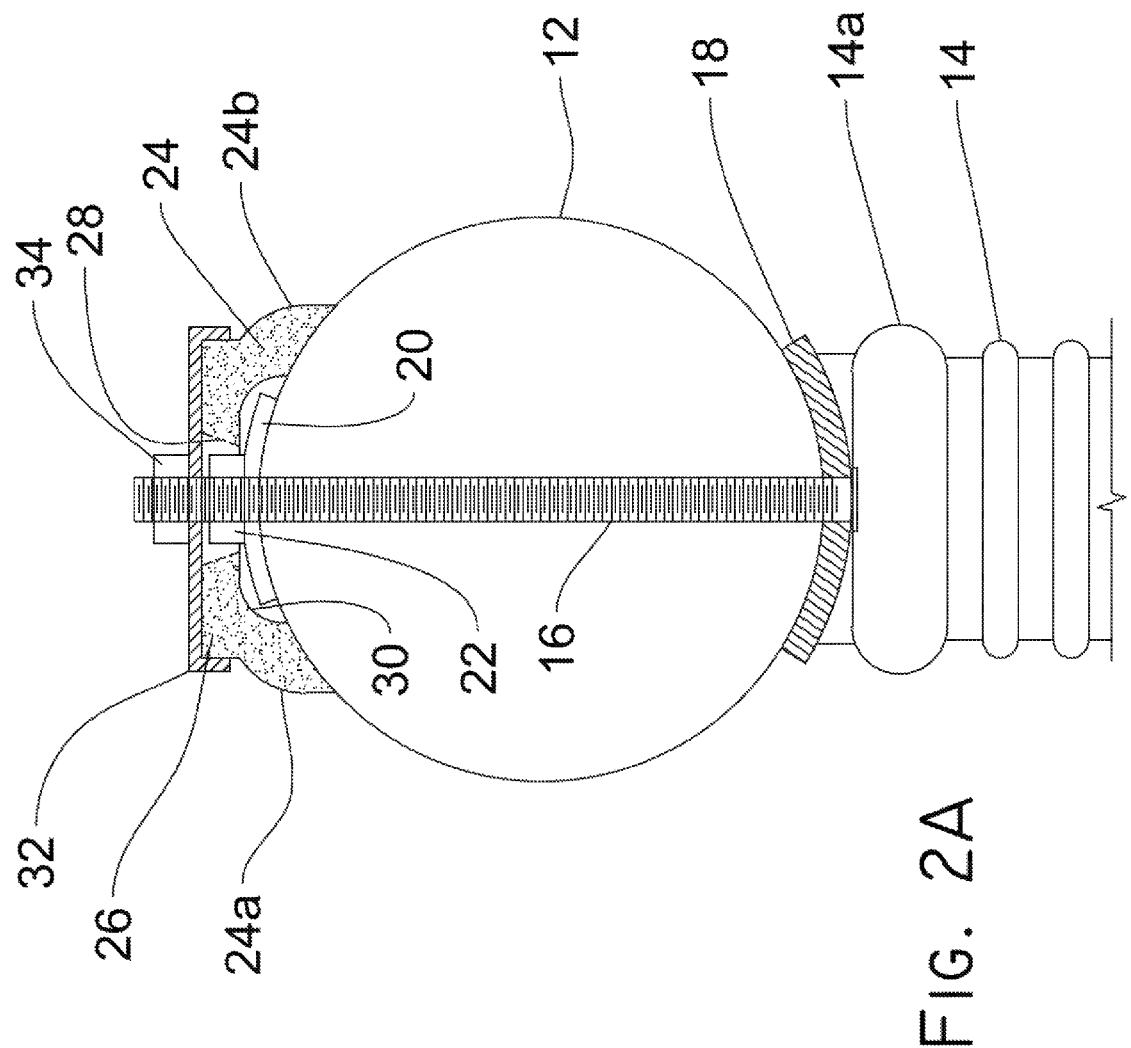
FIG. 2A is a sectional view taken along line 2A-2A in FIGS. 1A and 1B.

In FIG. 2A, conventional insulator 14 having base 14a is secured to pole 12 near the uppermost end thereof by elongated bolt 16. Front support 18 conforms to the shape of pole 12 and its upper end provides support for insulator base 14a. Front support 18 has an elongated vertical extent as depicted in FIGS. 1A and 1B.

Conventional, pre-existing washer 20 near the top of FIG. 2A has an arcuate shape to conform to the shape of pole 12 and is held against the pole by conventional, pre-existing nut 22. Said washer and nut are diametrically opposed to conventional, pre-existing insulator base 14a.

The novel structure includes elongated brace 24 having laterally spaced apart legs 24a, 24b that bear against the top of pole 12 in diametrically opposed relation to elongated front plate 18 as depicted. Legs 24a, 24b are formed integrally with base 26 of elongated brace 24. At least two bolt-accommodating openings 28 are formed in said base 26, said openings being centered on a longitudinal axis of symmetry of said elongated brace. Each opening 28 is in open communication with an associated washer-accommodating opening 30. A plurality of openings 28 is formed along the vertical extent of elongated brace 24 as indicated in FIG. 1B. Each opening 28 may be provided as a circular opening or as an elongated slot as indicated in said FIG. 1B and as indicated in FIG. 3 as well.

Reinforcing base 26 is square at its outer or outboard surface, i.e., the surface that does not contact pole 12. Washer plate 32 conforms to that square configuration and overlies said outer surface as depicted. Nut 34 screwthreadedly engages bolt 16 and secures washer plate 32 and hence brace 24 to the top of the pole in diametric opposition to insulator 14 and elongated front support 18. Each washer plate 32 thus performs the function of a washer.

Figure 3:
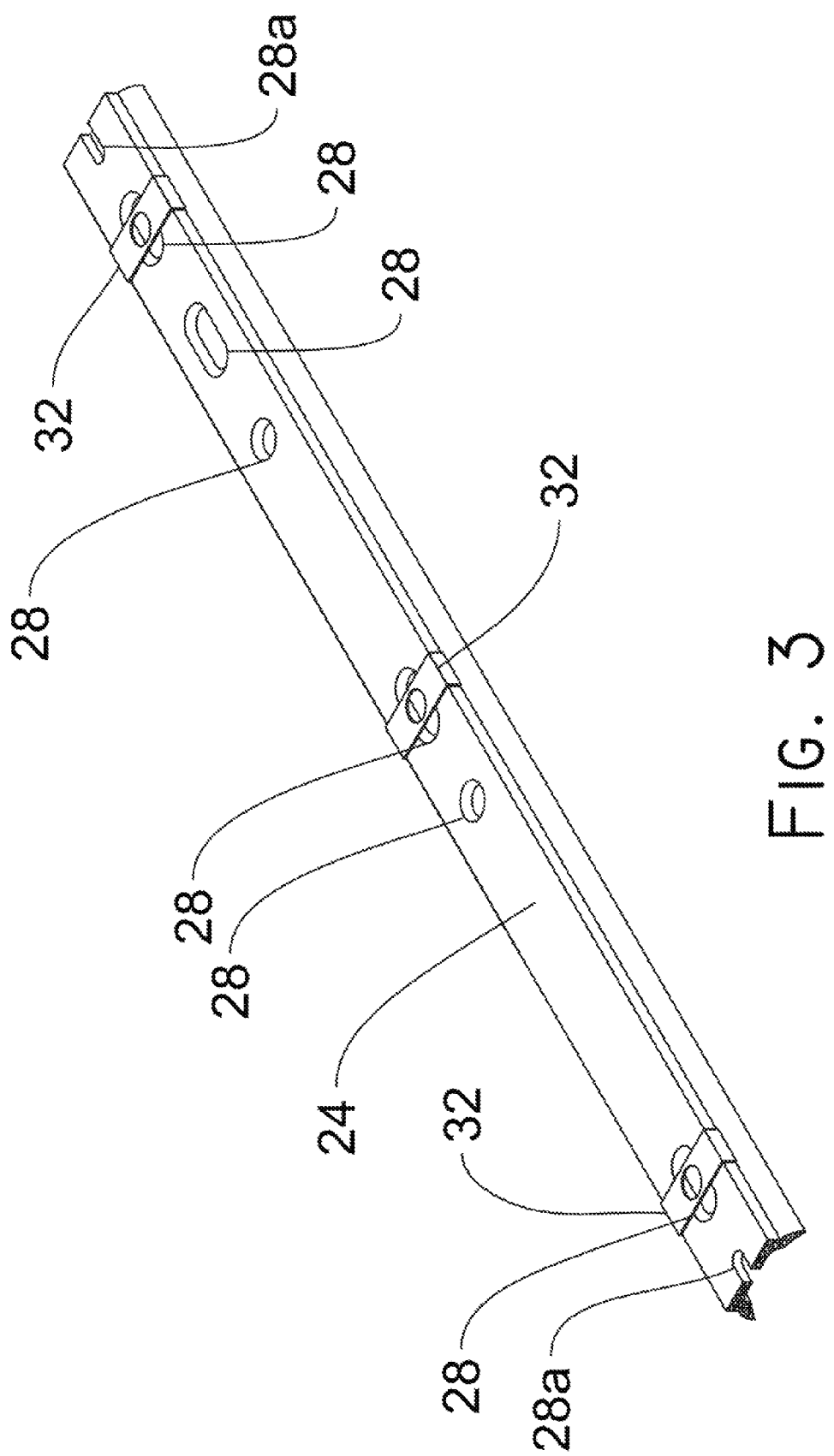
FIG. 3 is a perspective view of the back support brace of the first, second, and third embodiments.

Said elongated brace 24 and washer plates 32 are depicted in perspective view in FIGS. 1A and 3. Openings 28 are provided in plural locations in both circular and slotted form to accommodate various pole structures. Open slots 28a at the opposite ends of elongated brace 24 are used to accommodate pre-existing bolts as needed.

It will be observed in the embodiment of FIG. 2A that each nut 34 is provided at the time of pole repair, i.e., conventional nut 22 remains in its original position.

Figure 4:
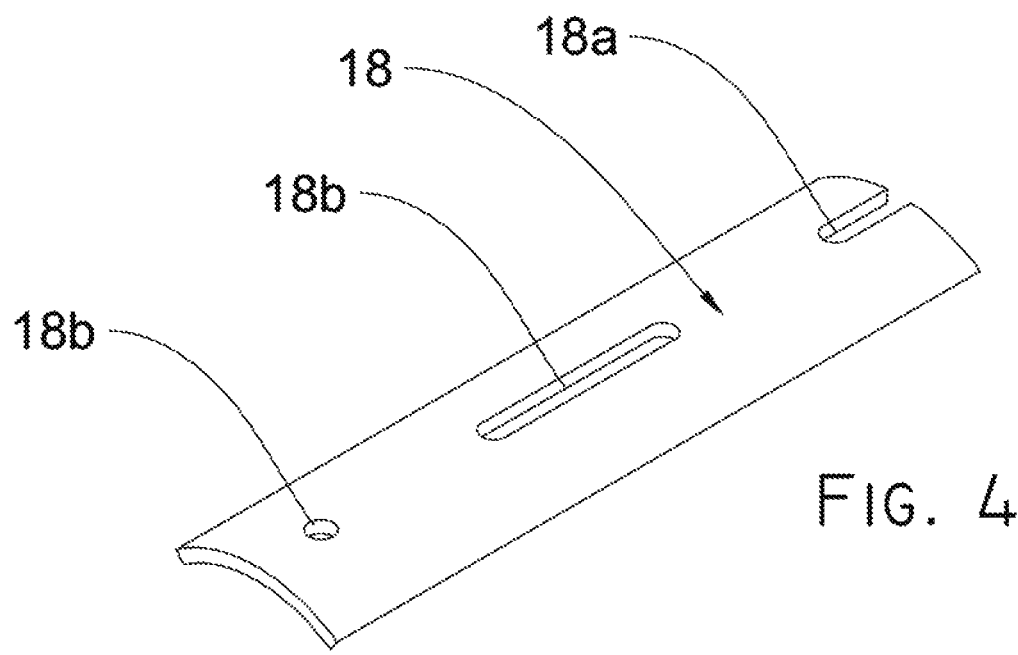
FIG. 4 is a perspective view of the elongated front support that is common to the first three embodiments.

Novel front support 18, depicted in FIGS. 1A, 1B, and 4 has an elongated structure. It has a first end that underlies insulator 14 and a second end that is longitudinally spaced apart from the first end and which therefore does not underlie the insulator.

Front support 18 is arcuate in transverse section and its upper end is slotted as at 18a to accommodate elongated bolt 16 which is not depicted in FIG. 4. Circular or slotted openings 18b are formed therein as depicted to accommodate bolts as needed for fastening front support 18 to the front or insulator side of pole 12.

Front support 18 and elongated brace 24, which provides back support, are disposed in diametrically opposed relation to one another and hold pole 12 in sandwiched relation between them.

Figure 2B:
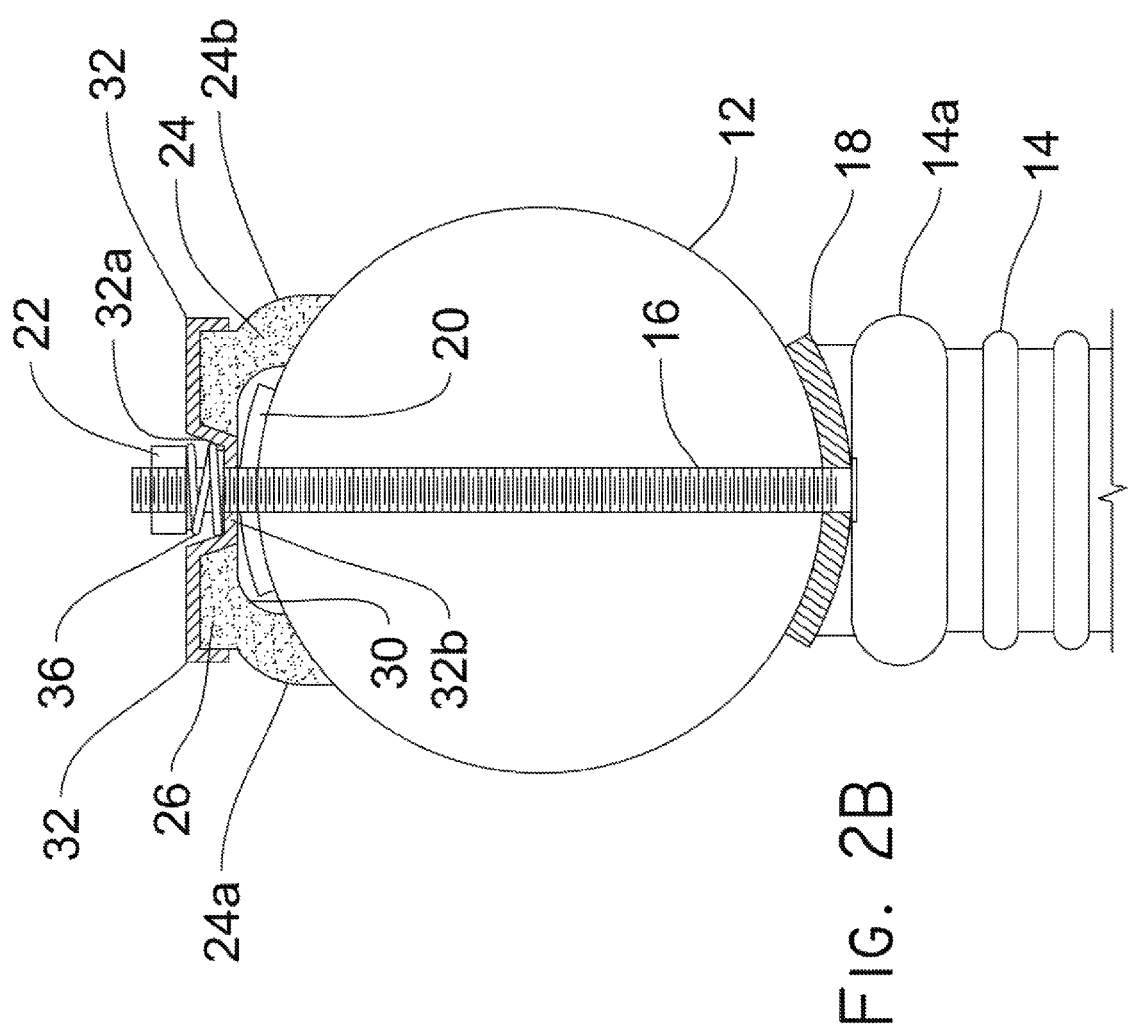
FIG. 2B is a view similar to the sectional view of FIG. 2A but depicts a second embodiment.

FIG. 2B depicts a second embodiment where conventional nut 22 is removed from bolt 16 and then re-engaged thereto. In this second embodiment, each washer plate 32 has a recessed channel 32a formed in the center thereof as depicted. Channel 32a includes centrally-apertured bottom wall 32b and said bottom wall is substantially flush with washer-accommodating opening 30. Bottom wall 32b thus performs the function of a washer and reinforces conventional washer 20

Each spring lock 36 fits within channel 32a and abuts channel bottom plate 32b. Conventional nut 22 is returned to its screw-threaded engagement with bolt 16 to bear against spring lock 36. This second embodiment has the advantage of not requiring second nut 34 of the first embodiment.

FIG. 2C depicts a third embodiment where conventional nut 22 remains as in the first embodiment in screw-threaded engagement with bolt 16, and where additional nut 34 of the first embodiment is also used.

In this third embodiment, each washer plate 32 has a raised ridge 33 that includes centrally-apertured top wall 33a as depicted in FIG. 2C. Conventional nut 22 and spring lock 36 are disposed in bearing relation to conventional washer 20. Each washer plate 32 is then placed into overlying relation to base 26 of elongated brace 24 in registration with each opening 28 as needed. A second spring lock 38 is placed into overlying relation to each top wall 33a and is secured thereto by a nut 34.

A fourth embodiment is depicted in FIGS. 5A, 5B, 6A, and 6B. This embodiment has utility in connection with upstanding poles 12 having a cross arm 44, with or without braces 44a. The perspective view of FIG. 6A depicts a certain embodiment of cross arm support member 46. Apertures 48 are formed in elongated support base 50 and may take the form of a circular opening or an elongated slot as depicted. A ninety-degree bend forms vertical flange 52 enabling attachment of vertical cross arm support member 46 to cross arm 44 as depicted in FIGS. 5A and 5B. As illustrated in FIG. 6B, through bolts 57 pass through apertures 48 on flanges 52 into cross arm 44 to secure vertical cross arm support member 46 to cross arm 44.

As depicted in FIG. 5A, bolt 56 is inserted into pole 12 through aperture 48 to secure cross arm support member 46 to said pole. Cross arm support member 46 is positioned on pole 12 so that flange 52 serves as a support surface for cross arm 44 at generally the mid-length region of said cross arm. Flanges 52 provide support for cross arm 44 and inhibits rotation of said cross arm in a vertical and horizontal plane.

As depicted in FIG. 5B, bolts 56, which secure cross arm support member 46 to pole 12 preferably extend diametrically through the pole and when used with suitable nuts and washers secure cross arm support member 46 to pole 12. Further bolts may be used to further secure said cross arm support member 46 to pole 12, said cross arm support member 46 being provided with multiple apertures along its extent and slots at its opposite ends for that purpose. A certain embodiment may include an elongated brace, similar to elongated brace 24 shown in FIG. 3, diametrically opposed from cross arm support member 46 to sandwich pole 12. The sandwiching of pole 12 between cross arm support member 46 and the elongated brace provides additional support for flanges 52.

Referring now to FIGS. 7, an embodiment of the cross arm support member, generally denoted by reference numeral 100, includes an elongated body having a generally C-shaped cross-section. Support 100 was designed to reinforce the attachment of insulators 14 (shown in FIGS. 7E-7F) to a cross arm 44 (shown in FIGS. 7B, 7E, and 7F). The design specifically allows an installer to first secure support 100 to cross arm 44 without requiring the installer to first detach insulators 14 from cross arm 44. This order of operation is substantially safer than first detaching insulator 14, and in turn a high voltage electrical line, prior to securing support 100 to cross arm 44.

Figure 7A:
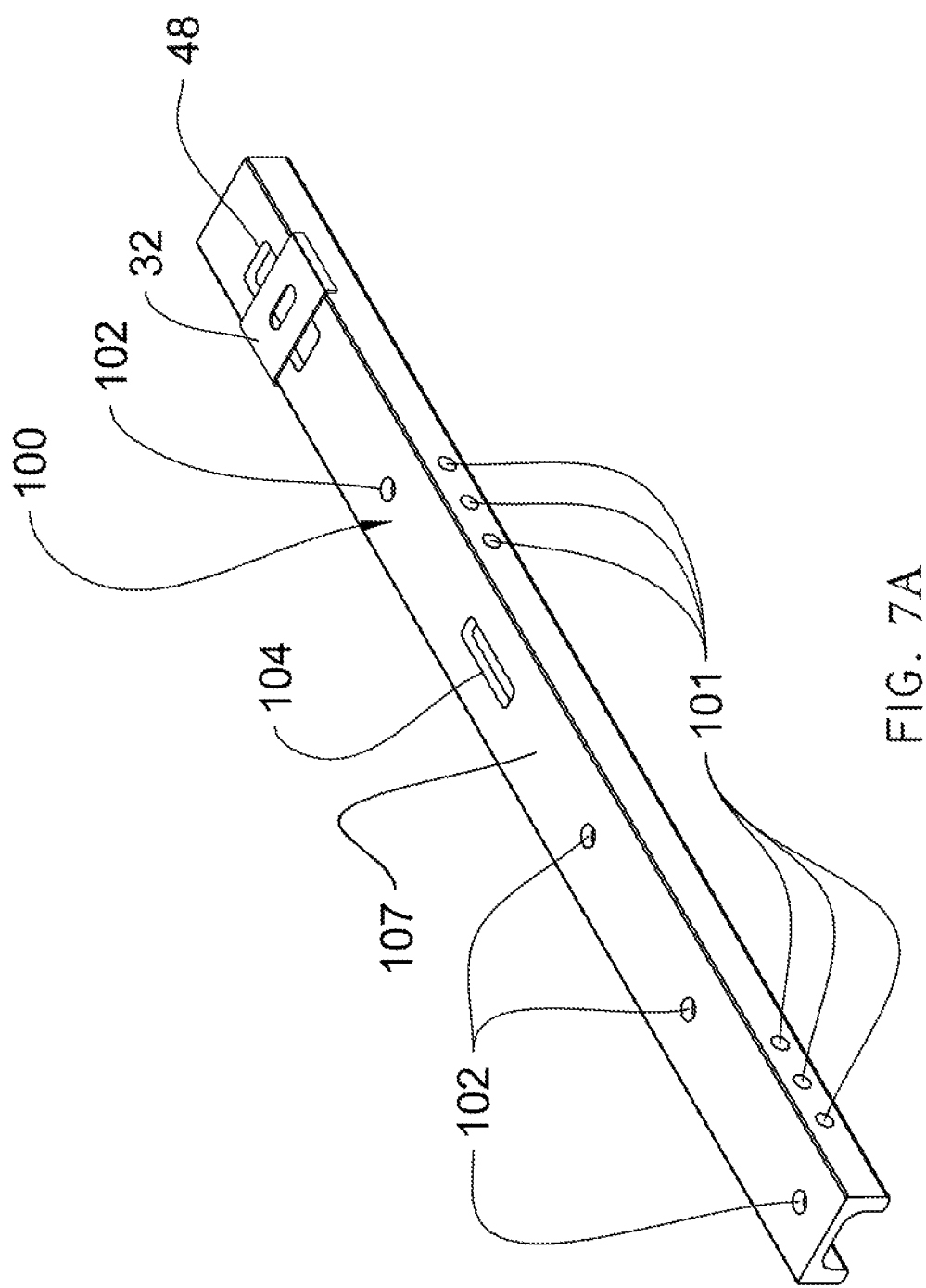
FIG. 7A is a perspective view of an embodiment of the vertical cross arm support member.
Figure 7B:
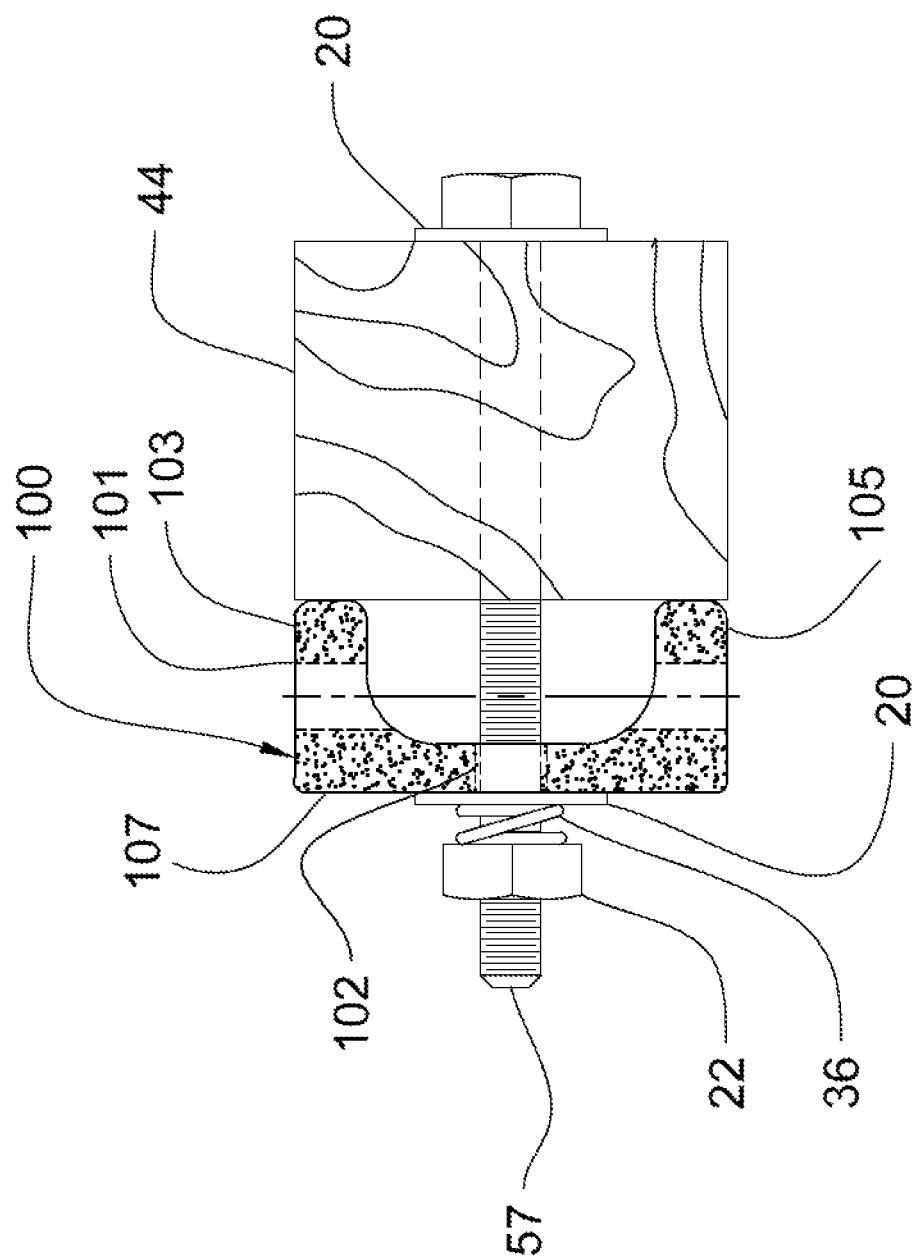
FIG. 7B is a side view of an embodiment of the vertical cross arm support member.

As depicted in FIG. 7A, support 100 includes a plurality of apertures and accesses. Support 100 includes at least one attachment apertures 102 to receive hardware, such as attachment bolt 57 for securing support 100 to cross arm 44, as depicted in FIG. 7B. Support 100 preferably includes a plurality of attachment apertures spaced along front wall 107 of support 100. Multiple attachment apertures allow an installer to vary the attachment points based on the location of the wood rot in cross arm 44.

Figure 7E:
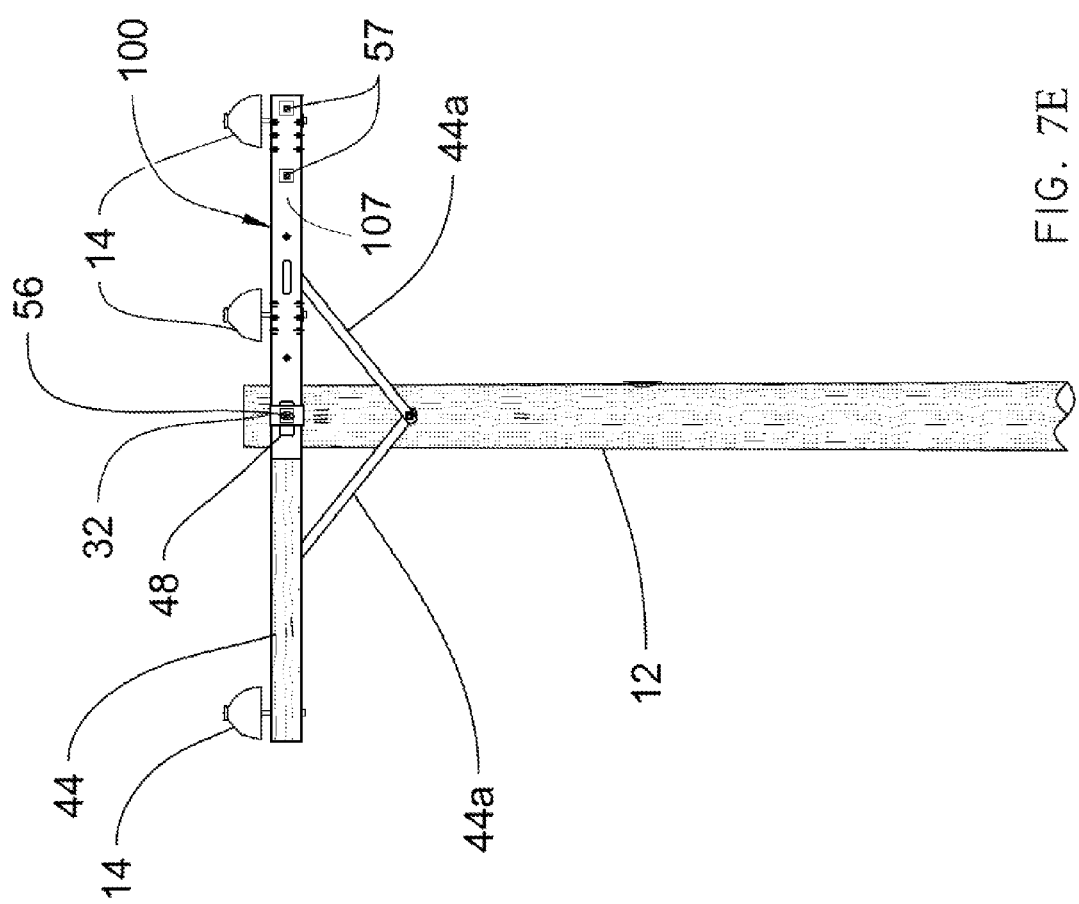
FIG. 7E is a front elevation view of an embodiment of the vertical cross arm support member secured to a portion of a horizontal cross arm.
Figure 7F:
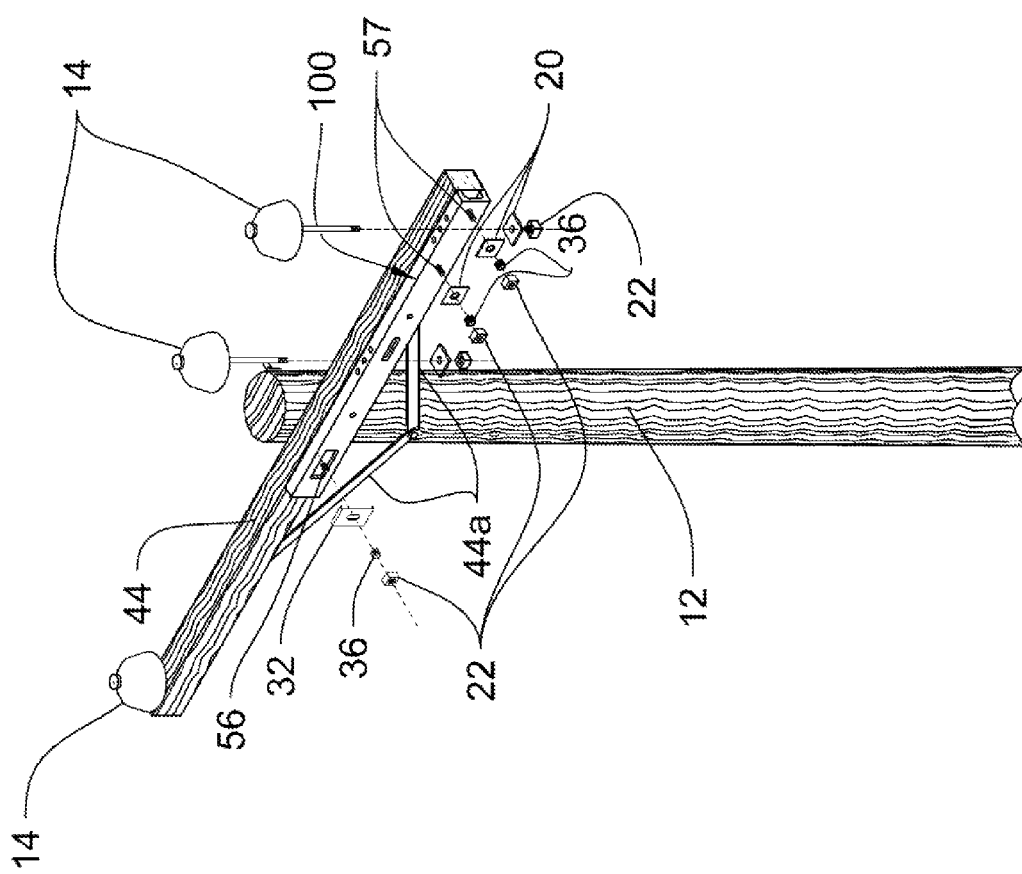
FIG. 7F is a perspective view of an embodiment of the vertical cross arm support member secured to a portion of a horizontal cross arm.

Referring now to FIGS. 7C-7F, support 100 includes aperture 48, which may take the form of a circular opening or an elongated slot formed in front wall 107. As illustrated in FIG. 7E-7F, a prior existing through bolt 56 passes through utility pole 12 and horizontal cross arm 44 before being received by aperture 48. Existing through bolt 56 is used to secure support 100 to utility pole 12 and horizontal cross-arm 44 using washer 32, nut 22, and preferably spring lock 36. Depending on the length of through bolt 56, washer 32 may take any of the shapes depicted in FIGS. 2A-2C.

Support 100 preferably also includes access 104. Access 104 has a size and shape to receive the existing bolt or nut that secures existing support beam 44a to cross arm 44. In addition, access 104 preferably has a size and shape to receive tools for engaging the existing bolt or nut. Access 104 is preferably spaced between eighteen and thirty-two inches from aperture 48, which is the typical range for the distance between upstanding utility pole 12 and the location at which support beam 44a is secured to cross arm 44.

In an embodiment, the existing through bolt securing support beam 44a to cross arm 44 may be secured to support 100 using washer 32, nut 22, and preferably spring lock 36 in generally the same manner for securing through bolt 56 to support 100. In addition, depending on the length of the existing through bolt, washer 32 may take any of the shapes depicted in FIGS. 2A-2C.

The main goal of support 100 is improve safety by enabling the support to be secured directly to cross arm 44 without having to first remove insulators 14 and in turn the high voltage lines attached to said insulators. For that reason, support 100 is designed to be secured to the side of cross arm 44 as depicted in FIGS. 7B and 7E-7F. When in end view, FIG. 7B, support 100 has a height (vertical extent in FIG. 7B) generally equal to the height of cross arm 44. A standard wooden cross arm is three to five inches wide and four to six inches tall. Therefore, an embodiment of support 100 has a height of about four to six inches.

An embodiment includes a cavity created generally about the midpoint of the height of support 100 to receive existing nuts or bolts that do not align with or do not pass through access 104 or aperture 48. The width (horizontal direction in FIG. 7B) of the cavity is preferably around two inches to accommodate the typical bolt and nut sizes used on utility poles.

The height of the cavity is less than the height of cross arm 44 to ensure that flanges 103, 105 do not wrap around to the top and bottom surfaces of cross arm 44, which could cause the flanges to contact the existing insulators and may inhibit proper attachment of support 100 to cross arm 44. Therefore, the cavity preferably has a height equal to or less than six inches (i.e. equal to or less than the height of the cross arm).

As depicted in FIGS. 7 an embodiment of support 100 has a generally C-shaped cross-section established by front facing wall 107 with upper flange 103 and lower flange 105 respectively integrated into the upper and lower ends of front facing wall 107. The cross-sectional shape, however, may be any shape that includes the open cavity generally located about the midpoint of the height of support 100 when in end view. Furthermore, it is considered that the cavity may extend the full length or a partial distance along the length (in the direction of the width of the paper in FIGS. 7C-7D) of the support 100.

The upper and lower flanges each include insulator apertures 101. The insulator apertures 101 on upper flanges 103 are axially aligned to the insulator apertures 101 on lower flanges 105. As such, insulators 14 can be removed from rotted/deteriorating cross arm 44 and secured to support 100 using, for example, washer 20 and nut 22 as depicted in FIG. 7F. Regardless of the cross-sectional shape, the upper wall 103 and lower wall 105 will include a plurality of insulator apertures. Therefore, upper and lower walls/flanges 103, 105 have a width great enough to include insulator apertures 101.

Furthermore, upper and lower walls/flanges 103, 105 preferably include at least two laterally space sets of insulator apertures 101. FIGS. 7 depict two sets of three insulator apertures 101. Having multiple insulator apertures 101 in each set is intended to provide an installer with some flexibility in the exact location at which insulator 14 is secured to support 100. In addition, the sets are laterally spaced at least twenty inches, which is the industry-established minimum safe distance between insulators 14. The safety standards governing this spacing can change and, therefore, the minimum distance between insulator apertures 101 on two distinct sets of insulator apertures may vary according to safety standards.

As depicted in FIGS. 7E and 7F, support 100 preferably extends half of the length of cross arm 44. Support 100, however, may have any length to reinforce any section/portion of cross arm 44 including the entire length of cross arm 44.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A cross arm reinforcing apparatus, comprising:
an existing cross arm secured to a utility pole;
a cross arm support, the cross arm support having:

an elongated front wall having a first aperture with a size and shape to receive an existing through bolt passing through the upstanding utility pole and the cross arm, and a second aperture configured to receive a through bolt passing through the cross arm and the front wall;

an upper flange extending from an upper half of the front wall in a lateral direction;

a lower flange extending from a lower half of the front wall in the lateral direction;

an open cavity created between the upper flange and the lower flange at least partially along the extent of the elongated front wall, wherein the open cavity is configured to receive existing nuts or bolts secured to the cross arm;

the upper flange having at least two laterally spaced insulator apertures that are axially aligned with two laterally spaced insulator apertures on the lower flange; and the cross arm support secured to the existing cross arm with a free end of the upper flange and a free end of the lower flange proximate a lateral surface of the existing cross arm.

2. The apparatus of claim 1, further comprising the cavity having a height less than a height of the cross arm.

3. The apparatus of claim 1, further comprising the upper and lower flanges having at least two laterally spaced sets of insulator apertures, wherein each set includes two or more insulator apertures.

4. The apparatus of claim 1, further comprising each flange having a minimum of twenty inches between the at least two laterally spaced insulator apertures.

5. The apparatus of claim 1, further comprising an access opening laterally spaced between eighteen and thirty-two inches from the first aperture, wherein the access opening is sized to provide access to an existing nut or bolt head adjacent to the cross arm.

6. The apparatus of claim 1, further comprising:
the least two laterally spaced insulator apertures on the upper flange being a first grouping of apertures;
a second grouping of at least two la Tally spaced insulator apertures disposed in the upper flange;
the first grouping of insulator apertures disposed in the upper flange laterally spaced from the second grouping of insulator apertures disposed in the upper flange at a distance greater than the spacing between the apertures in each grouping;
the least two laterally spaced insulator apertures on the lower flange being a first grouping of apertures;
a second grouping of at least two laterally spaced insulator apertures disposed in the lower flange;
the first grouping of insulator apertures disposed in the lower flange laterally spaced from the second grouping of insulator apertures disposed in the lower flange at a distance greater than the spacing between the apertures in each grouping.

7. A cross arm reinforcing apparatus, comprising:
an existing cross arm secured to a utility polo;
a cross arm support, the cross arnr support having:
an elongated front wall having a first aperture with a size and shape to receive an existing through bolt passing through the upstanding utility pole and the cross arm, and a second aperture configured to receive a through bolt passing through the cross arm and the front wall;
an upper wall extending from an upper half of the front wall in a lateral direction;
a lower wall extending from a lower half of the front wall in the lateral direction;
the upper wall having at least two laterally spaced insulator apertures that are axially aligned with two laterally spaced insulator apertures on the lower wall; and
whereby the cross arm support is attached to a side wall of the existing cross arm without interfering with insulators previously attached to the existing cross arm while also providing a vertical attachment for securing the insulators to the apparatus.

8. The apparatus of claim 7, further comprising an open cavity between the upper and lower walls, wherein the open cavity has a height equal to or less than four and a half inches.

9. The apparatus of claim 7, further comprising the upper and lower walls having at least two laterally spaced sets of insulator apertures, wherein each set includes two or more insulator apertures.

10. The apparatus of claim 7, further comprising each wall having a minimum of twenty inches between the at least two laterally spaced insulator apertures.

11. The apparatus of claim 7, further comprising an access opening laterally spaced between eighteen and thirty-two inches from the first aperture, wherein the access opening is configured to provide access to an existing nut or bolt securing a support beam to the cross arm.

12. A method of reinforcing a horizontally disposed cross arm mounted to an upstanding utility pole without having to first remove the existing insulators from the horizontally disposed cross arm, comprising:
securing a cross arm support to the horizontally disposed cross arm with a free end of both an upper flange and a lower flange in contact with the horizontally disposed cross arm, the cross arm support further including:
an elongated front wall having a first aperture with a size and shape to receive an existing through bolt passing through the upstanding utility pole and the cross arm, and a second aperture configured to receive a through bolt passing through the cross arm and the front wall;
the upper flange extending from an upper half of the front wall in a lateral direction;
the lower flange extending from a to lower half of the front wall in the lateral direction;
an open cavity created between the upper flange and the lower flange at least partially along the extent of the elongated front wall; and
the upper flange having at least two laterally spaced insulator apertures that are axially aligned with two laterally spaced insulator apertures on the lower flange; and
removing the existing insulators from the horizontally disposed cross ann and attaching them to the cross arm support via the insulator apertures in the upper and lower flanges.

* * * * *